June 9, 1953

H. BROCK 2,641,210

TRACTOR-MOUNTED FERTILIZING IMPLEMENT

Filed Jan. 30, 1950

Harvey Brock
INVENTOR.

BY *Clarence A. O'Brien*
*and Harvey B. Jacobson*

June 9, 1953        H. BROCK        2,641,210
TRACTOR-MOUNTED FERTILIZING IMPLEMENT
Filed Jan. 30, 1950        4 Sheets-Sheet 2
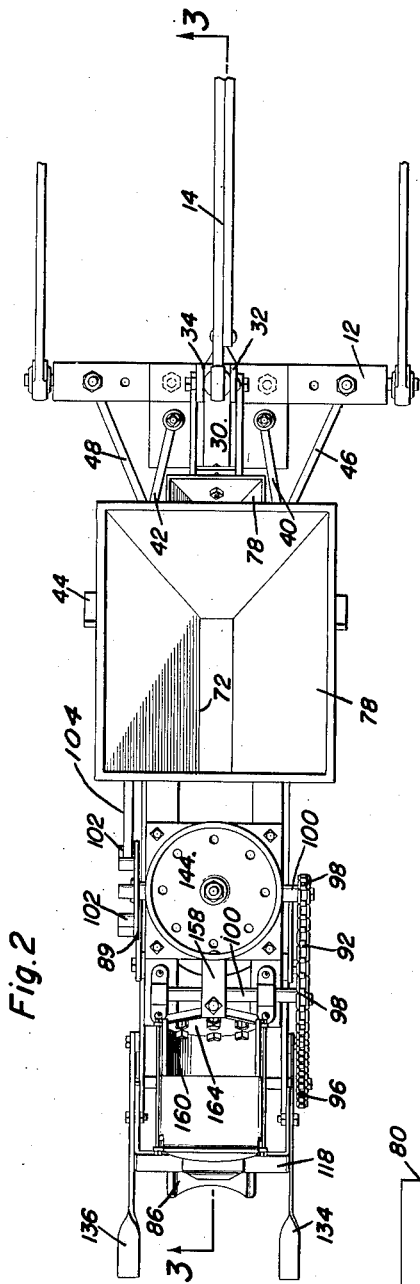
Harvey Brock
INVENTOR.

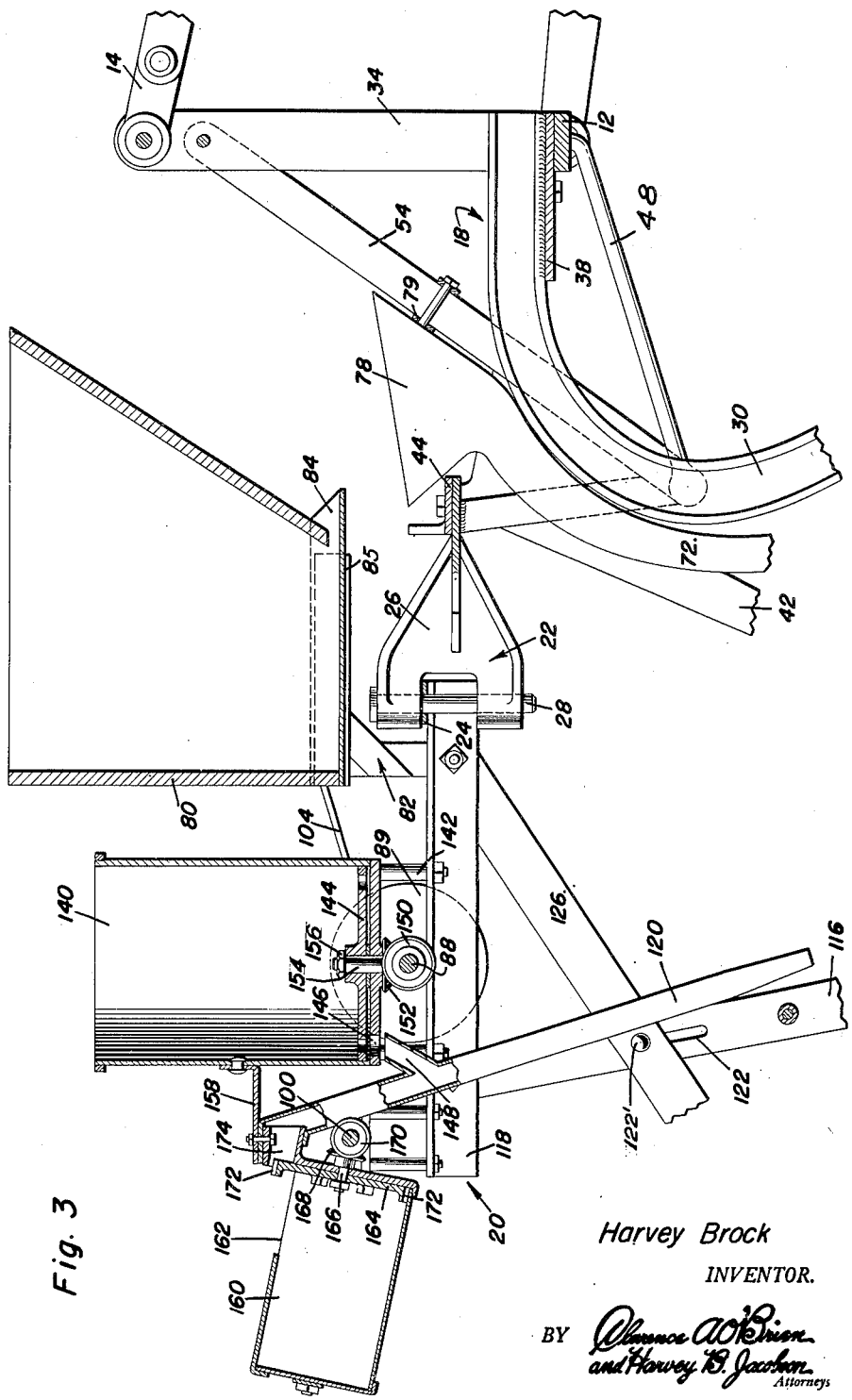

June 9, 1953 H. BROCK 2,641,210
TRACTOR-MOUNTED FERTILIZING IMPLEMENT
Filed Jan. 30, 1950 4 Sheets-Sheet 4

Harvey Brock
INVENTOR.

Patented June 9, 1953

2,641,210

UNITED STATES PATENT OFFICE 2,641,210

TRACTOR-MOUNTED FERTILIZING IMPLEMENT

Harvey Brock, Carrollton, Ga.

Application January 30, 1950, Serial No. 141,230

1 Claim. (Cl. 111—65)

This invention relates to novel and useful improvements in farm implements of the type which is adapted to be drawn by a tractor.

An object of this invention is to open a furrow, deposit and mix fertilizer in the furrow and the soil forming the furrow and then deposit one or more grains of seed in the furrow, the placing of the grain or seed being accomplished in response to forward movement of the two connected frames on which the various appurtenances are located.

Another object of this invention is to vibrate a fertilizer hopper or at least a part of the fertilizer hopper, as for example, the bottom thereof, in response to the forward movement of the frame, this vibration or shaking causing a quantity of fertilizer to fall within a chute and since the lower end of the chute is located between the plow for initially cutting the furrow and a furrow side breaker mechanism, the fertilizer is deposited and then worked in the furrow soil.

Ancillary objects and features will become apparent in following the description of the illustrated form of the invention.

In the drawings:

Figure 2 is a top view of the mechanism in Figure 1, the tractor being omitted;

Figure 3 is an enlarged sectional view of a portion of the structure shown in Figure 1, the tractor being omitted;

Figure 4 is a sectional view taken substantially on the line 4—4 of Figure 1 and in the direction of the arrows;

Figure 5 is a side view of a portion of the mechanism;

In the illustrations there is a fragmentary portion of a tractor generally indicated at 10 and having various elements which are conventional, as a draw bar 12 with lift arms 14 connected therewith and also adjusting mechanisms 16 for the lower draw bar arms.

Figure 1:
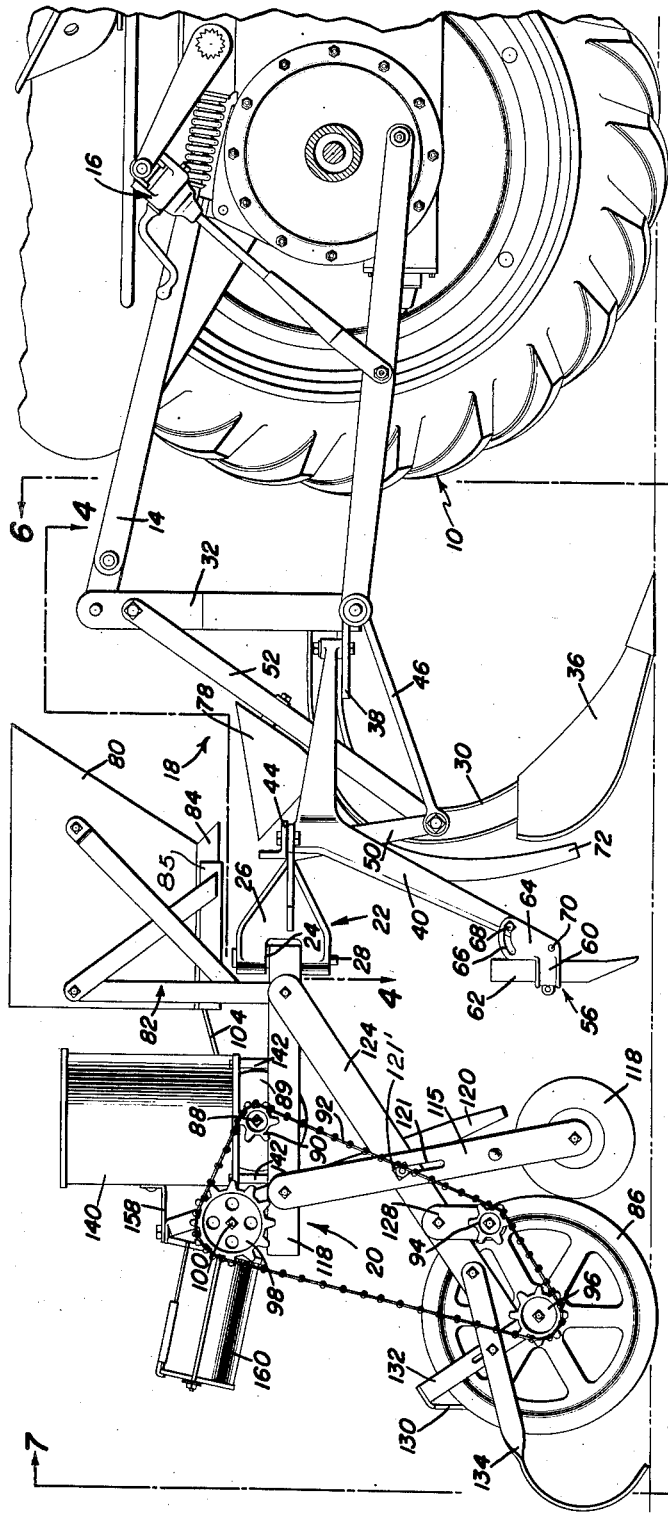
Figure 1 is an elevational view of the device showing it attached to a part of a tractor.
Figure 6:
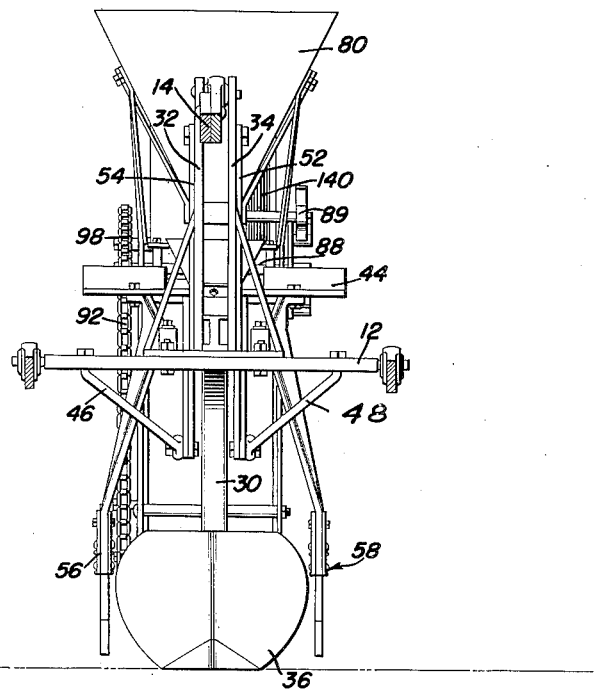
Figure 6 is a sectional view taken on the line 6—6 of Figure 1.
Figure 7:
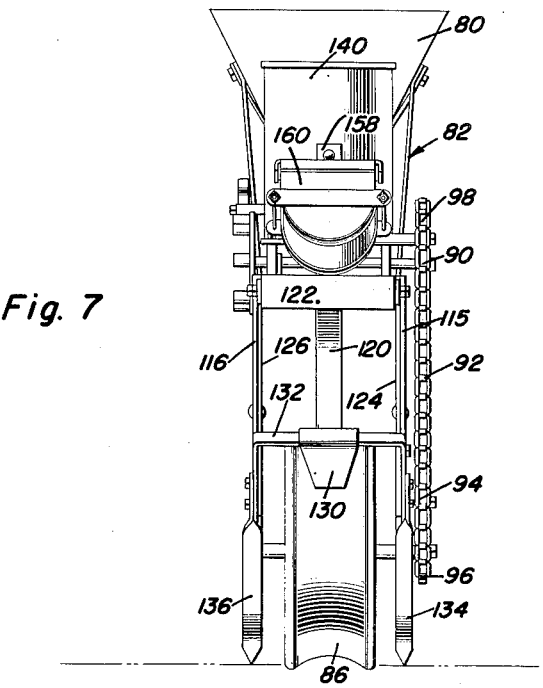
Figure 7 is a view taken on the line 7—7 of Figure 1 and in the direction of the arrows.

A first frame generally indicated at 18 is secured to the draw bar 12 and a second frame 20 is secured to the first frame by means of a hitch 22. This second frame has a plate 24 secured to the forward end thereof (Figure 4) and said frame 18 has a yoke 26 at the rear end thereof (Figure 1) with a vertical coupling pin 28 passed through the yoke and one of the number of apertures in the plate 24. This forms a flexible hitch for connecting the front or first frame with the second or rear frame 20 so that said frames 18, 20 are relatively swingable about a vertical axis.

The first frame includes the plow beam 30 which is secured at one end to the vertically rising arms 32 and 34, these arms being disposed on the tractor draw bar 12. The lower end of the plow beam carries the plow 36 which is adapted to cut a furrow as the tractor moves forwardly through a field.

A bearing plate 38 is secured to the draw bar and has the rearwardly diverging arms 40 and 42 secured thereto. These arms are also fixed intermediate their ends, to the apertured plate 44, which forms the rear part of the first frame 18. Secured to the draw bar 12 and forming a part of the front frame 18 is a pair of rearwardly converging arms 46 and 48. These rearwardly converging arms are secured to the depending brackets 50 which are fixed rigid with the plate 44. Links 52 and 54 are secured to the vertically rising members 32 and 34 and to the brackets 50 at their junctions with the rearwardly converging arms 46 and 48.

By the above described structure, the entire front frame is capable of being lifted as the tractor draw bar is raised by means of the motive force mechanism normally connected with a tractor draw bar.

Disposed at the lower end of each rearwardly diverging arms 40 and 42, respectively, is a device for breaking the sides or, the soil forming the sides of the furrow which is opened by the plow 36. The devices 56 and 58 are identical in structure. The device 56 includes a bearing 60 of the split type with a chisel 62 passed therethrough. Inasmuch as the bearing is of the split type, loosening or tightening of the fastening screw allows the chisel to be adjusted therein. A flange 64 extends from one side of the bearing 60 and has a slot 66 therein. A screw 68 with an appropriate nut is passed through the slot and also through an opening in the arms 40. The lower end of the flange 64 is pivoted, as by the pin 70 to the lower end of the arm 40. Accordingly, pivotal movement of the bearing and the flange 64 about the pin 70 is permitted and when this pivotal adjustment is arrived at, it may be maintained by tightening the nut on the bolt 68.

A chute 72 having an inlet funnel 78 is bolted to a small plate 79 (Figure 4) carried by the links 52 and 54. The chute 72 is adapted to receive fertilizer from the fertilizer box 80.

The fertilizer box 80 is carried on a structural framing which forms a support 82 at the forward end of the second frame 20. The bottom 84 is mounted for reciprocation on the pair of rails or tracks 85 which are disposed at the lower open end of the hopper 80. The fertilizer box 80 is positioned over the hitch 22 to feed into said inlet funnel to feed into the chute 72.

Means for reciprocating the bottom 84 of the hopper is operatively connected with a packing wheel 86 which is carried at the rear end of the frame 20. This means consists of a shaft 88 which is mounted in suitable bearings on the frame 20 and which has a wheel 89 at one end thereof. A gear 90 is fixed to the other end thereof and has a chain 92 entrained therearound. This chain is also entrained around an idle 94, a sprocket 96 which is fixed to the packing wheel 86 and another sprocket 98 which is secured to a shaft 100. The shaft 100 is mounted in suitable bearings and also carried by the second frame.

The wheel 89 is provided with a plurality of pins 102 (Figure 5) which strike an arm 104 which is pivoted to the support 82 (Figure 5). This arm is pivoted by means of a small shaft 106, which shaft has a plate 108 secured thereto. Plate 108 has a slightly curved slot 110 therein and a pin 112 which is secured to one side of the bottom 84 of the hopper after passing through a slot 114 in one of the rails 85 for supporting the bottom, is disposed in the slightly curved slot 110. Therefore, when the wheel 89 rotates in response to movement of the packing wheel 86, the arm 104 is struck by the pins thereby causing the small shaft 106 to oscillate, hence imparting a shaking or vibratory movement to the bottom 84 of the hopper 80. This causes the fertilizer to be dropped in the chute 72 for deposit in the furrow which has been opened by the plow 86. Thereafter, the devices 56 and 58 work the sides of the furrow with the fertilizer therein.

A pair of links 115 and 116 are pivoted to and depend from the platform 118, forming a part of the frame 20. At the lower ends of these links there is a pair of parting disks 118 for parting the soil very slightly in advance of the tube 120. Slots 121 and 122 are formed longitudinally in the links 115 and 116 intermediate their ends to accommodate bolts 121', 122' which are passed therethrough. These bolts 121', 122' also pass through links 124 and 126 which are pivoted at their upper ends to the platform 118 to incline rearwardly and downwardly across the links 115, 116 and which have the packing wheel axle carried thereby at the other ends. Thus the links 115 and 124, and 116 and 126 are interconnected respectively, by bolt and slot connections, for relative vertical adjustment of the parting disks 118 and packer wheel 86. The idler sprocket bracket 128 is also carried by the links 115 and 116.

A packing wheel cleaner 130 is mounted on a yoke 132 which is secured to the lower ends of the links 124 and 126. A slot is provided in each side of the yoke 132 to accommodate a pin. Each pin is passed through a spring-type drag member 134 and 136 (Figure 2) which is adapted to pull loose soil over the packed furrow after it has been operated on by the packing wheel 86.

A grain or seed box 140 is disposed on brackets 142 which are carried by the platform 118. This grain or seed box has a rotary distributor 144 (Figure 3) in the bottom thereof. The distributor is of the apertured plate type, which apertures align with a discharge opening 146 during operation thereof. Said tube 120 has a branch 148 extending therefrom which communicates with the discharge opening 146.

As the shaft 88 is rotated, the gear 150 which is secured thereto and which is enmeshed with the gear 152 causes the plate 144 to rotate, since it is secured by means of the axle 154 and nut 156. Accordingly, in response to forward movement of the frames, the rotary distributor is operated through the chain and sprocket drive. A bracket 158 is secured to the grain box 140 and supports the upper end of the tube 120. It also supports a second grain box 160 which has an opening 162 at the top part thereof. A rotary distributor wheel 164 is mounted on an axle 166 in the second grain box 160 and has its rotation imparted thereto through the gears 168 and 170, respectively. The gear 168 is fixed to the axle 166, while the gear 170 is fixed to a shaft 100. Inasmuch as the shaft 100 has the sprocket 98 secured thereto which is chain operated, forward movement of the frames causes operation of this distributor.

The grain box 160 has its longitudinal axis tilted at an angle with respect to the horizontal causing the grain to flow by gravity toward the rotating disk 164. This rotating disk has a number of pockets 172 formed therein which, when they are at the top of their travel, communicate with the conduit 174, which conduit communicates with the tube 120. This deposits grain or seed in the tube 120, it being possible to employ two different types of grain or seed in the two hoppers or a single type in each.

In operation the tractor is set in motion in a field. The plow 36 opens the furrow initially and inasmuch as the bottom 84 of the hopper is shaken by the described structure, fertilizer drops from the hopper 80 into the chute 72 for deposit behind the plow 36 and in the furrow which is opened thereby.

The soil forming the sides of the furrow is worked by the devices 56 and 58 causing the fertilizer to be worked therein. Then, mounted on the second frame, and following behind the first frame, is the parting disks 118 which open a small minor furrow in the larger furrow so that the seed or grain which is carried by both of the seed boxes 140 and 160 respectively, may be dropped therein.

Rearwardly of the parting disks is the packing wheel 86, whence the force for operation of the hopper bottom 84 and the two distributors is obtained. The packing wheel also serves its purpose of packing the furrow, while the members 134 and 136 pull loose earth over the sides of the packed furrow.

Having described the invention, what is claimed as new is:

For use with a tractor, a fertilizing implement comprising a first frame carried by said tractor to travel therewith, a chute and a plow in front of said chute both carried by said first frame, a hitch means in alignment with said chute and plow fixed to said first frame and extending rearwardly thereof, a second frame pivoted to said hitch means to swing about a vertical axis, a fertilizer hopper secured to said second frame and positioned over said hitch means, said hopper being provided with movable feed means, said feed means having a forwardly located discharge end positioned over said chute, and means for imparting movement to said feed means to discharge fertilizer into said chute for deposit in the furrow formed by the plow including a ground engaging wheel mounted on said second frame in alignment with said chute and plow, said wheel serving to support said second frame and pack the deposited fertilizer.

HARVEY BROCK.

References Cited in the file of this patent

UNITED STATES PATENTS

| Number | Name | Date |
|---|---|---|
| 187,412 | Pennal | Feb. 13, 1877 |
| 201,204 | Shine | Mar. 12, 1878 |
| 322,595 | Glenn | July 21, 1885 |
| 333,723 | Billings | Jan. 5, 1886 |
| 422,603 | Loughry | Mar. 4, 1890 |
| 644,303 | Weddle | Feb. 27, 1900 |
| 670,534 | Carmical | Mar. 26, 1901 |
| 733,873 | Randall | July 14, 1903 |
| 746,676 | Coffee | Dec. 15, 1903 |
| 757,020 | Butler | Apr. 12, 1904 |
| 786,161 | Sanford | Mar. 28, 1905 |
| 824,576 | Owen | June 26, 1906 |
| 840,274 | Weaver | Jan. 1, 1907 |
| 922,922 | Linder | May 25, 1909 |
| 1,050,165 | Pence | Jan. 14, 1913 |
| 1,079,509 | Pearson | Nov. 25, 1913 |
| 2,455,727 | Bunting | Dec. 7, 1948 |